(12) United States Patent
Berger et al.

(10) Patent No.: US 9,835,151 B2
(45) Date of Patent: Dec. 5, 2017

(54) HYDRAULIC DEVICE, IN PARTICULAR LOW-PRESSURE ACCUMULATOR WITH A CLOSURE ELEMENT

(75) Inventors: Franz Berger, Buchenberg (DE); Andreas Weh, Sulzberg (DE); Holger Fischer, Haldenwang (DE); Bernd Lutz, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 955 days.

(21) Appl. No.: 13/994,752

(22) PCT Filed: Oct. 18, 2011

(86) PCT No.: PCT/EP2011/068163
§ 371 (c)(1),
(2), (4) Date: Oct. 28, 2013

(87) PCT Pub. No.: WO2012/079807
PCT Pub. Date: Jun. 21, 2012

(65) Prior Publication Data
US 2014/0047973 A1 Feb. 20, 2014

(30) Foreign Application Priority Data
Dec. 17, 2010 (DE) .................. 10 2010 063 318

(51) Int. Cl.
*F04B 53/16* (2006.01)
*B23K 20/10* (2006.01)
(Continued)

(52) U.S. Cl.
CPC ............ *F04B 53/16* (2013.01); *B23K 20/106* (2013.01); *B60T 8/368* (2013.01); *F04B 1/0404* (2013.01); *F04B 1/0421* (2013.01); *F15B 1/04* (2013.01); *F15B 2201/21* (2013.01); *F15B 2201/31* (2013.01); *F15B 2201/4056* (2013.01); *F15B 2201/605* (2013.01)

(58) Field of Classification Search
CPC .......... B23K 20/106; F04B 53/16; F16J 13/02
See application file for complete search history.

(56) References Cited

U.S. PATENT DOCUMENTS 5,615,806 A * 4/1997 Grothoff ............. B05B 11/3059
                                                       222/153.13
7,066,208 B2 * 6/2006 Kort ......................... F15B 1/04
                                                              138/109
(Continued)

FOREIGN PATENT DOCUMENTS

DE   100 16 895 A1   10/2001
DE   101 08 121 A1    9/2002
(Continued)

OTHER PUBLICATIONS

International Search Report corresponding to PCT Application No. PCT/EP2011/068163, dated Mar. 27, 2012 (German and English language document) (7 pages).

*Primary Examiner* — Thomas E Lazo
*Assistant Examiner* — Matthew Wiblin
(74) *Attorney, Agent, or Firm* — Maginot, Moore & Beck LLP

(57) ABSTRACT

A hydraulic device includes a housing and a closure element arranged thereon. The closure element is connected to the housing by torsional welding.

11 Claims, 3 Drawing Sheets

(51) Int. Cl.
*B60T 8/36* (2006.01)
*F04B 1/04* (2006.01)
*F15B 1/04* (2006.01)

(56) References Cited

U.S. PATENT DOCUMENTS

| | | | | |
|---|---|---|---|---|
| 7,637,176 B2 * | 12/2009 | Woersinger | .......... | G01D 11/245 |
| | | | | 73/866.5 |
| 2005/0006393 A1 * | 1/2005 | Carter | .................. | B29C 70/086 |
| | | | | 220/581 |
| 2006/0071054 A1 * | 4/2006 | Bolser | .................... | B23K 20/10 |
| | | | | 228/124.6 |
| 2011/0253727 A1 * | 10/2011 | Petzendorfer | ............. | F17C 1/00 |
| | | | | 220/581 |

FOREIGN PATENT DOCUMENTS

| | | | | |
|---|---|---|---|---|
| DE | 10108121 A1 * | 9/2002 | ............ | B60T 8/4068 |
| DE | 102004015440 A1 * | 10/2005 | ........... | B23K 33/006 |
| DE | 10 2010 010 327 A1 | 10/2010 | | |
| EP | 0 667 270 A2 | 8/1995 | | |
| EP | 1 930 148 A1 | 6/2008 | | |
| JP | 8-505592 A | 6/1996 | | |
| JP | 11-334565 A | 12/1999 | | |
| JP | 2003-80378 A | 3/2003 | | |
| JP | 2004-17121 A | 1/2004 | | |
| JP | 2008-12573 A | 1/2008 | | |

* cited by examiner

HYDRAULIC DEVICE, IN PARTICULAR LOW-PRESSURE ACCUMULATOR WITH A CLOSURE ELEMENT

This application is a 35 U.S.C. §371 National Stage Application of PCT/EP2011/068163, filed on Oct. 18, 2011, which claims the benefit of priority to Serial No. DE 10 2010 063 318.6, filed on Dec. 17, 2010 in Germany, the disclosures of which are incorporated herein by reference in their entirety.

The disclosure relates to a hydraulic device, in particular a low-pressure accumulator, having a closure element, and to a method for producing a hydraulic device, in which method a connection of a closure element to a housing of the hydraulic device is realized.

Known hydraulic devices have cavities in which hydraulic fluids are situated during the operation of the hydraulic device and which must be closed off with respect to the surroundings of the hydraulic device. Such cavities often serve as pressure accumulators, in particular low-pressure accumulators, on a hydraulic device. Furthermore, piston pumps as hydraulic devices have a piston which is guided in an axially movable manner in a cylinder liner inserted into a cylinder bore of a pump housing. A closure element in the form of a cover is arranged on the cylinder liner of the cylinder bore and closes off the latter in a pressure-tight manner. The closure element is often also a constituent part of other components of a hydraulic device, in particular of an accumulator, of a valve, of a hydraulic connector and/or of a motor.

The closure element is normally inserted into the housing of the hydraulic device using known connecting techniques. Here, the closure element is calked or is arranged in the housing by means of an additional element, for example a circlip, or by way of connecting means such as screws. It is also known for the closure element to be attached by means of the so-called "self clinch" connecting technique.

Here, known connecting techniques are relatively expensive and may be difficult to seal off over the service life of the hydraulic device. Finally, said connecting techniques have a certain space requirement, which increases the overall dimensions of the hydraulic device.

SUMMARY

According to the disclosure, a closure element is connected to the housing of a hydraulic device, in particular of a low-pressure accumulator on a piston pump used for a vehicle brake system of a motor vehicle, by torsional welding or torsional friction welding by means of a sonotrode. Here, by means of plastic deformation of the material of the two components closure element and housing, a fluid-tight, in particular gas-tight cohesive connection of the closure element to the housing is realized. It is thus achieved that the closure element is non-detachably connected to the housing in an extremely small space. In the case of torsional welding, it is in particular the case that the sonotrode penetrates plastically into the closure element and sets the latter in high-frequency vibration (in particular by ultrasound).

With the method of torsional welding used according to the disclosure, the leak-tightness of the connection is ensured over the entire service life of the hydraulic device. Owing to the non-detachable connection, it is for example also the case that the problem of the loosening of a screw connection as a result of vibration loading during operation can no longer arise. Furthermore, the method according to the disclosure results in a space saving, because for example O-rings for sealing and also support rings and threads are no longer required, and/or no material need be made available for a calking process involving deformation. As a result, the production costs for the production process according to the disclosure can be reduced, because components and material can be saved and because lower demands can be placed on the tolerances of the components used, in particular the closure element. Overall, it is possible to save on material for the housing because the axial forces during torsional welding (for example 1 kN to 10 kN) are lower than those that arise in particular during calking.

According to the disclosure, an interface is provided in the housing by virtue of a cylindrical bore being formed by means of a chip-removing process, which cylindrical bore may then in particular also serve as a piston running surface for an accumulator piston. Said bore has a first chamfer, that is to say a beveled surface at its edge for transition to an abutment shoulder, which merges into a second chamfer. Said second chamfer in turn merges into a transition radius of the outer surface of the housing. Here, the depth of the axial abutment surface is preferably between 0.5 mm and 1.0 mm, and is in particular 0.7 mm. The first chamfer has an angle of approximately 30° with respect to the longitudinal axis of the closed bore, and the second chamfer has an angle of approximately 40° to 45°.

The centering of the closure element with respect to the housing is realized by means of the second chamfer in interaction with in particular the outer edge of the closure element. The second chamfer thus also serves as an assembly aid if, for the connection of the closure element to the housing, the closure element is mounted onto the interface on the housing. Here, the second chamfer need not extend over the entire circumference of the closure element, but rather may be omitted in regions, in particular in two opposite side regions of a cuboidal housing with the opposite side surfaces thereof. It is sufficient for the closure element to be centered in the remaining region of its contact surface against the housing. The outer edge of the closure element may thereby nevertheless be centered over the region of the thickness or plate thickness of the housing. It is important merely that the closure element makes contact over its entire circumference with the housing, in order to be torsion-welded over said circumference.

After the mounting of the closure element, the connection to the housing is produced by means of the stated torsional welding technique using a sonotrode of a torsional welding plant.

Here, the sonotrode is designed such that, through the axial exertion of pressure on the closure element, positive and non-positive locking is generated between the geometry of the sonotrode and the closure element. The surface of the closure element thus takes on the negative form of the punch, because the material of the closure element is plastically deformed by the action of the sonotrode. Here, the sonotrode is particularly advantageously of corrugated design, such that, through plastic deformation, the closure element exhibits positive and non-positive locking with the housing.

The connection of the material of the closure element to the base material of the housing is then realized by virtue of the sonotrode being excited at high frequency (approximately 10 kHz to 20 kHz) and thus, in the natural frequency range of the sonotrode, a suitable amplitude (approximately 30 μm to 50 μm) being generated which leads to a connection of said type.

In the case of existing housings of hydraulic assemblies for vehicle brake systems, the accumulator diameter of an associated accumulator, in particular of a low-pressure accumulator, is a size determinative of the plate thickness of the housing. It was thus hitherto necessary for the plate thickness to make available the material that was necessary for previously conventional calking processes for the fastening of a closure element. For example, in a conventional calking process, it was necessary for enough material to be applied to the closure element in order to satisfy the static and dynamic pressure demands of up to 500 bar.

In the case of the plate thickness of the housing according to the disclosure, it is no longer necessary for said material for deformation, which was conventionally required, to be made available.

In the case of the connection according to the disclosure, only one step, in particular with the stated second chamfer and the transition radius, is required at the interface. The ratio between the plate thickness and the effective diameter of the closure element and of an associated component, such as in particular an accumulator, can thus advantageously be reduced. Furthermore, the housing can be designed so as to be of smaller height, because no material needs to be made available for calking or for the arrangement of a circlip.

Furthermore, the axial loading and thus undesired deformations of other components or the housing interfaces thereof are reduced. Here, it is particularly advantageous that good functionality with regard to leak-tightness and stability is attained with the connection according to the disclosure, wherein the housing simultaneously has a lower operating weight requirement (preferably predominantly aluminum), and thus material is also saved. Furthermore, as a result of the cohesive connection according to the disclosure, a noise reduction in particular is attained in the case of a damper or accumulator.

The connection of a closure element to a housing by means of the method according to the disclosure may be used for a multiplicity of components, in particular for a piston chamber of a low-pressure accumulator. It is also preferable according to the disclosure for these to be components of a high-pressure damper chamber.

The connection according to the disclosure is preferably of gas-tight, in particular helium-tight form.

Furthermore, the strength of the connection preferably corresponds to at least the minimum tensile strength of the two materials of the parts to be connected, which simplifies a configuration on the basis of the requirements. In particular, the load capacity is defined by the connecting surface area multiplied by the minimum strength of the material.

For the connection according to the disclosure, use may preferably be made of a known welding plant which is suitable for torsional welding. Here, said welding plant has a converter with opposed piezo actuators and a vibration converter which imparts the force via a booster to the sonotrode and thus to the part to be welded, which is clamped into the lower part of the welding plant.

BRIEF DESCRIPTION OF THE DRAWINGS

An exemplary embodiment of the solution according to the disclosure will be explained in more detail below on the basis of the appended schematic drawings, in which.

DETAILED DESCRIPTION

Figure 1:
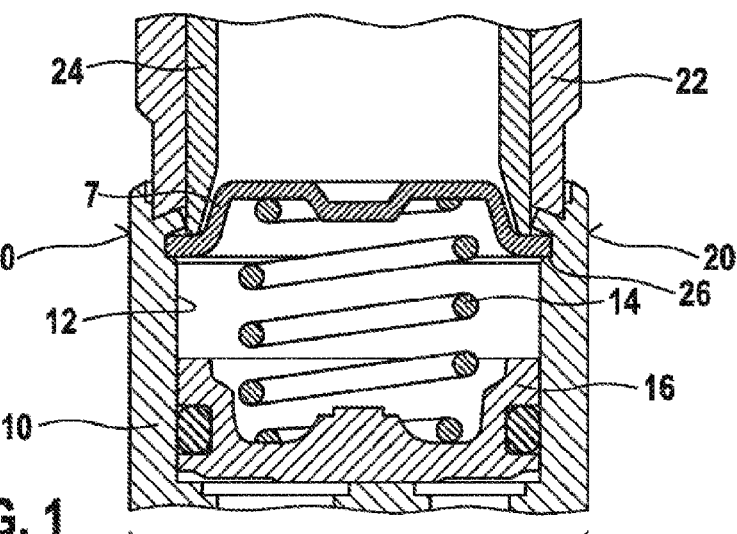
FIG. 1 shows an axial longitudinal section of a pump housing during the step of the pressing-on of a closure element, as per the prior art.

FIG. 1 illustrates the connection of a closure element 7 in the form of a cover to a pump housing 10 (in the present case a housing of a hydraulic device in the form of a piston pump) by pressing by means of a press plunger 22, as per the prior art.

The figure shows the pump housing 10, a cylindrical bore 12 formed therein, a helical spring 14 arranged in the bore 12, and an accumulator piston 16 resiliently preloaded by the helical spring 14. The accumulator piston 16 forms, together with the helical spring 14, an accumulator or an accumulator arrangement for the piston pump which is formed by the pump housing 10 and which is not illustrated in any more detail.

The closure element 7 is held, by means of a holding plunger 24, on a stepped abutment 26 which is formed in the interior of the cylindrical bore 12. The press plunger 22 is designed such that, through the exertion of axial pressure on the edge of the cylindrical bore 12, material of the pump housing 10 is displaced over the outer edge region of the closure element 7.

Here, in order to be able to attain fluid-tight sealing over the entire circumference of the closure element 7, it is important that material is displaced over the edge region of the closure element 7 likewise over the entire circumference thereof. The pump housing 10 is thus designed to be so thick or broad with regard to its thickness 18 that sufficient material for deformation is available even on side surfaces 20 of the pump housing 10.

The piston pump designed in this way with a pump housing 10 and a closure element 7 on the associated accumulator is designed for delivering fluids in particular for a hydraulic motor vehicle brake system in motor vehicles. Said piston pump serves in particular for selectively decreasing or increasing the brake pressure in the wheel brake cylinders within the context of a traction control system.

The piston pump according to the disclosure may however also be used, for example, as a high-pressure fuel delivery pump for an internal combustion engine, wherein the fuel enclosed in a delivery chamber is compressed.

Figure 2:
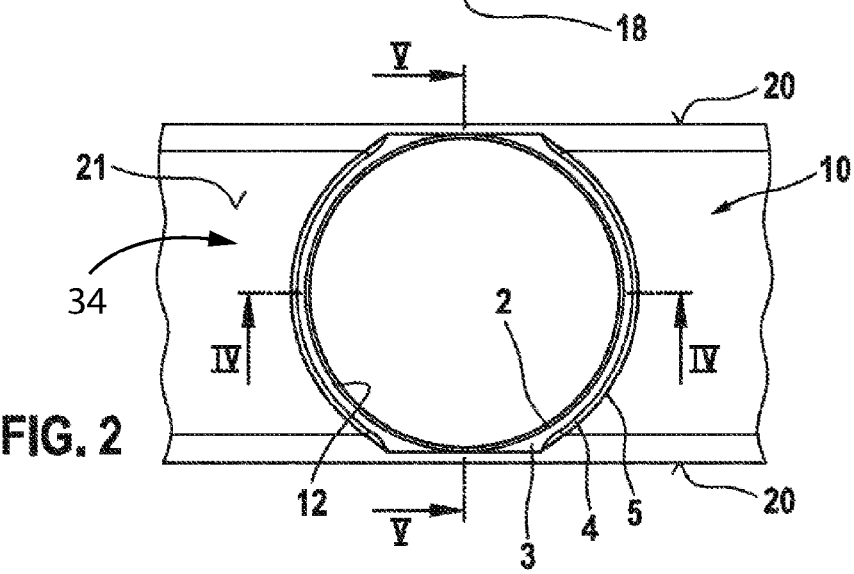
FIG. 2 shows a plan view of a pump housing of a piston pump according to the disclosure.

FIG. 2 shows a plan view of a pump housing 10, according to the disclosure, of a piston pump 34. On the pump housing 10 there is formed an interface for the mounting and attachment of a closure element 7, said interface being shown in more detail in sectional views in FIGS. 4 and 5. The interface forms a support for the closure element 7 for the subsequent connection of said closure element in a cohesive and in particular also leak-tight manner to the pump housing 10 by means of a torsional welding process.

Figure 3:
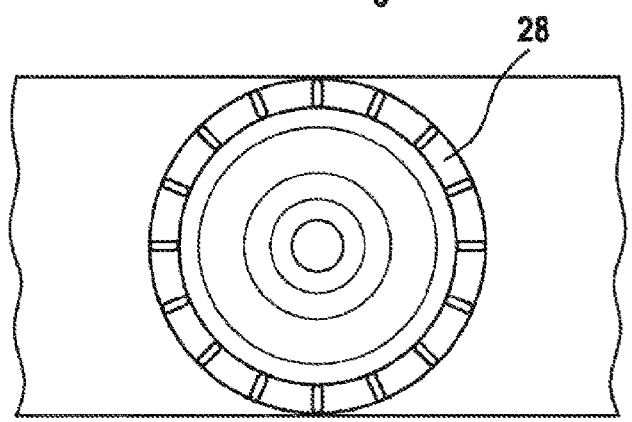
FIG. 3 shows a view from below of a sonotrode for torsional welding on the pump housing as per FIG. 2.

FIG. 3 shows a view from below of a corrugated sonotrode 28 of a torsional welding plant (not illustrated in any more detail). Said sonotrode 28 generates the cohesive connection between the closure element 7 and pump housing 10 by means of plastic deformation.

Figure 4:
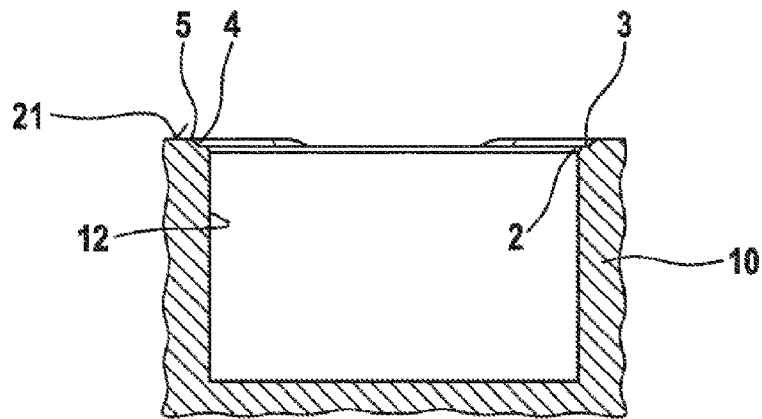
FIG. 4 shows the section IV-IV in FIG. 2 in a production step "chip-removing drilling"

FIG. 4 illustrates a first step of the method according to the disclosure for the production of a connection between a closure element 7 and a pump housing 10. For this purpose, there is likewise formed in the pump housing 10 a cylindrical bore 12 which then serves as a piston surface for an accumulator piston 16. On the outer edge of the cylindrical bore 12 there is formed a first chamfer 2, that is to say a beveled surface for a transition to an abutment shoulder 3, which merges into a second chamfer 4. The second chamfer 4 merges into a transition radius 5 on the top side 21 of the pump housing 10. The depth of the abutment shoulder 3 relative to the top side 21 is approximately 0.7 mm.

Figure 5:
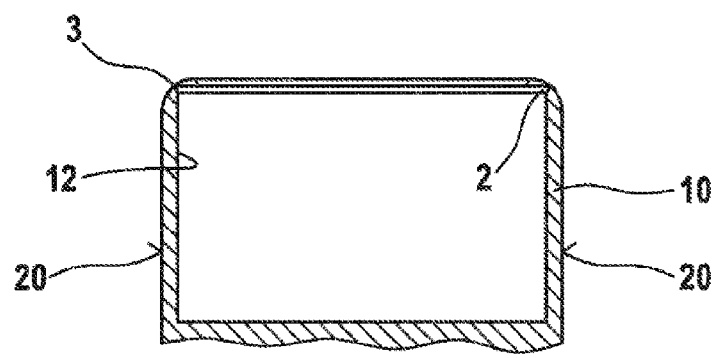
FIG. 5 shows the section V-V in a production step "chip-removing drilling"

FIG. 5 illustrates the form of said edge configuration at the side surfaces 20 of the pump housing 10. In said lateral region of the pump housing 18, the latter is formed so as to be so thin or narrow that only the first chamfer 2 and the abutment shoulder 3, but not the second chamfer 4, exist over the entire circumference of the cylindrical bore 12. As can be seen in particular in FIG. 4, the pump housing 10 may thus be formed with a particularly thin or narrow thickness 8.

Figure 6:
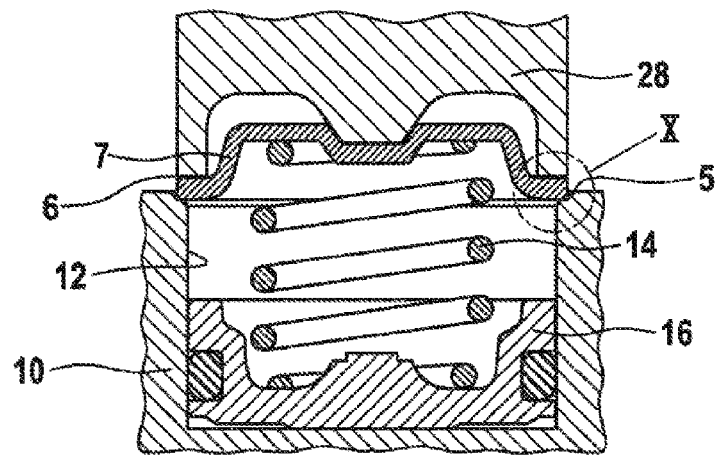
FIG. 6 shows the view as per FIG. 4 in a production step "mounting of the cover"

FIG. 6 shows, in an axial section, the next step for the production of the connection of pump housing 10 and closure element 7. Here, the closure element 7 is placed onto the abutment shoulder 3 and, in the process, is centered with the outer radius 6 of the closure element 7 on the transition radius 5 and the second chamfer 4. Said centering by means of the transition radius 5 and the second chamfer 4 is preferably not realized at the edge regions at the side surfaces 20, because no second chamfer 4 is provided there.

Figure 7:
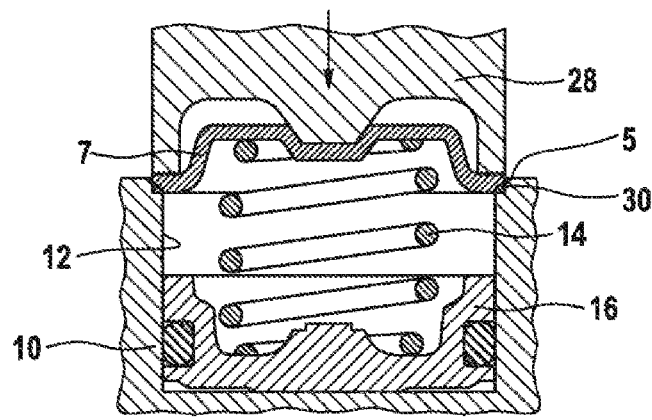
FIG. 7 shows the view as per FIG. 4 in a production step "welding of the cover"
Figure 8:
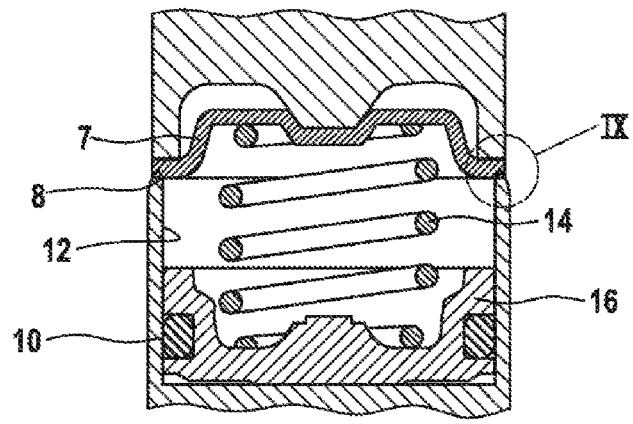
FIG. 8 shows the view as per FIG. 5 in the production step "welding of the cover"
Figure 9:
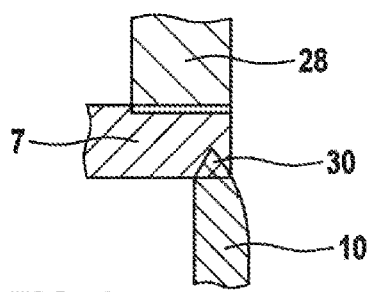
FIG. 9 shows the detail IX in FIG. 8.

FIGS. 7, 8 and 9 show the positively locking connection by means of torsional welding in a third step in which the welding itself takes place. For this purpose, a pressure force is applied axially to the closure element 7 by means of the sonotrode 28, and the sonotrode 28 is simultaneously excited at high frequency by means of a torsional welding plant which is not illustrated in any more detail. In this way, the material at the lower edge region of the closure element 7 connects to the material on the abutment shoulder 3 of the pump housing 10. The material which fuses on or melts on in the process is indicated in FIG. 7 and FIG. 9 by reference numeral 30.

At the same time, the negative form of the sonotrode 28 is impressed on the top side of the closure element 7, because said sonotrode is in particular of corrugated form on its contact surface facing the closure element 7.

Figure 10:
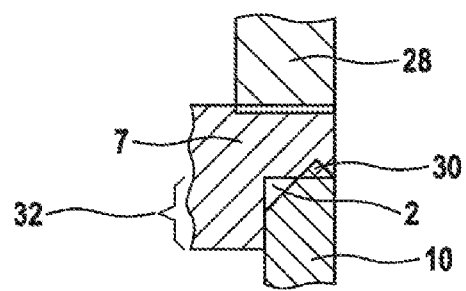
FIG. 10 shows a variant of the detail X in FIG. 6.

FIG. 10 shows a variant of the connection of the closure element 7 to the pump housing 10 and the cylindrical bore 12 thereof. The figure shows the chamfer 2 at the top edge of the cylindrical bore 12, and a step 32 which is formed on the closure element 7 and which projects into the cylinder bore 12 and, in so doing, covers the chamfer 2 in the axial direction of the bore 12. With said step 32 on the closure element 7, it is achieved that chips formed at the edge of the bore 12 during the formation of the torsional weld are retained in the chamfer 2 and cannot enter into the bore 12 and thus into the associated hydraulic system.

All of the features presented in the description, in the following claims and in the drawings may be essential to the disclosure both individually and also in any desired combination with one another.

The invention claimed is:

1. A hydraulic device, comprising:
   a housing defining a cylindrical bore and including a centering member that extends along only a portion of a circumference of the cylindrical bore, the centering member completely spaced apart from the cylindrical bore, such that no portion of the centering member is located within the cylindrical bore; and
   a closure element arranged on the housing and configured to be centered relative to the cylindrical bore by the centering member,
   wherein the closure element is connected to the housing by a torsional weld.

2. The hydraulic device as claimed in claim 1, wherein:
   the housing further defines an abutment shoulder that extends completely around the circumference of the bore,
   the closure element defines a circular periphery, and
   the torsional weld is formed on the abutment shoulder along an entire circumference of the closure element.

3. The hydraulic device as claimed in claim 2, wherein the centering member is not formed at a transition of the abutment shoulder to side surfaces of the housing.

4. The hydraulic device as claimed in claim 1, wherein the closure element is formed with a step facing toward the housing.

5. The hydraulic device as claimed in claim 1, wherein the hydraulic device is a piston pump.

6. The hydraulic device as claimed in claim 1, wherein the centering member includes a first chamfer formed in the housing and a second chamfer formed in the housing.

7. A method for producing a hydraulic device, comprising:
   centering a closure element relative to a cylindrical bore defined by a housing with a centering member of the housing that extends along only a portion of a circumference of the cylindrical bore and is completely spaced apart from the cylindrical bore, such that no portion of the centering member is located within the cylindrical bore; and
   connecting the closure element to the housing by a torsional weld.

8. The method as claimed in claim 7, wherein the closure element defines a circular periphery, and the method further comprises:
   forming the torsional weld on an abutment shoulder of the housing along an entire circumference of the closure element.

9. The method as claimed in claim 7, wherein:
   the housing further defines an abutment shoulder that extends completely around the cylindrical bore, and
   the centering member is not formed at a transition of the abutment shoulder to side surfaces of the housing.

10. The method as claimed in claim 7, wherein the method produces a low-pressure accumulator of a vehicle brake system of a motor vehicle.

11. The method as claimed in claim 7, wherein the hydraulic device is a pressure accumulator or a piston pump.

\* \* \* \* \*